July 29, 1969　　　I. A. DIVELBISS　　　3,457,710
LAWNMOWER
Filed Aug. 19, 1966　　　　　　　　　　　2 Sheets-Sheet 1
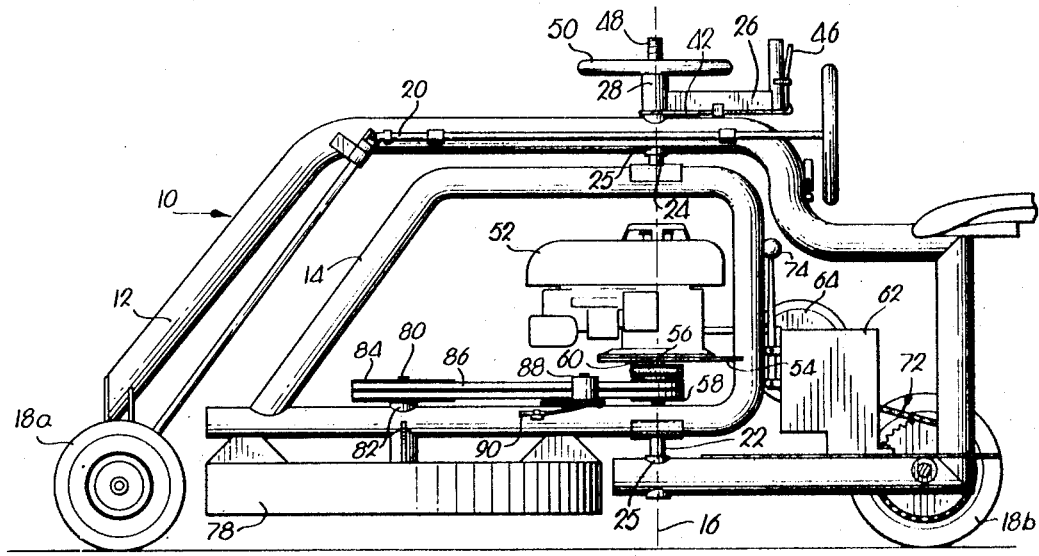
Fig.1.
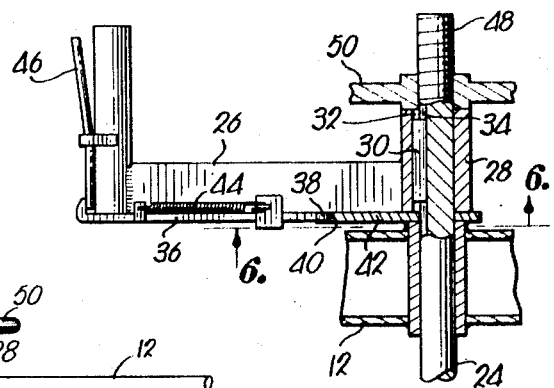
Fig.5.
Fig.4.
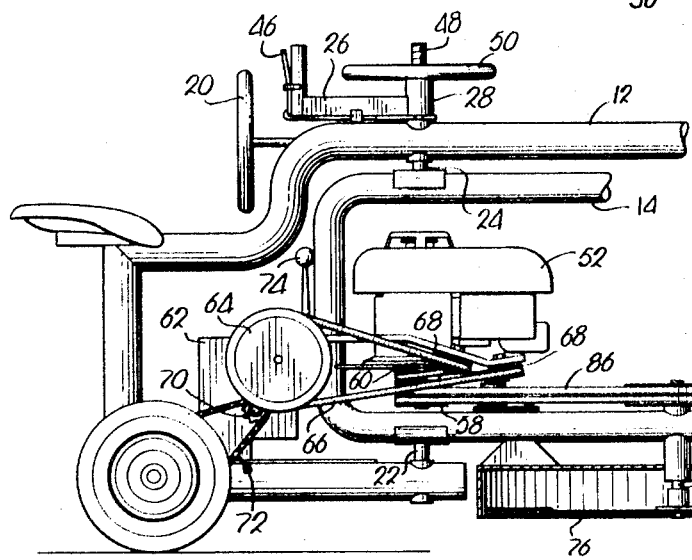
INVENTOR
Ivan A. Divelbiss
BY
Hovey, Schmidt, Johnson & Hovey
ATTORNEYS.

July 29, 1969     I. A. DIVELBISS     3,457,710
LAWNMOWER
Filed Aug. 19, 1966     2 Sheets-Sheet 2
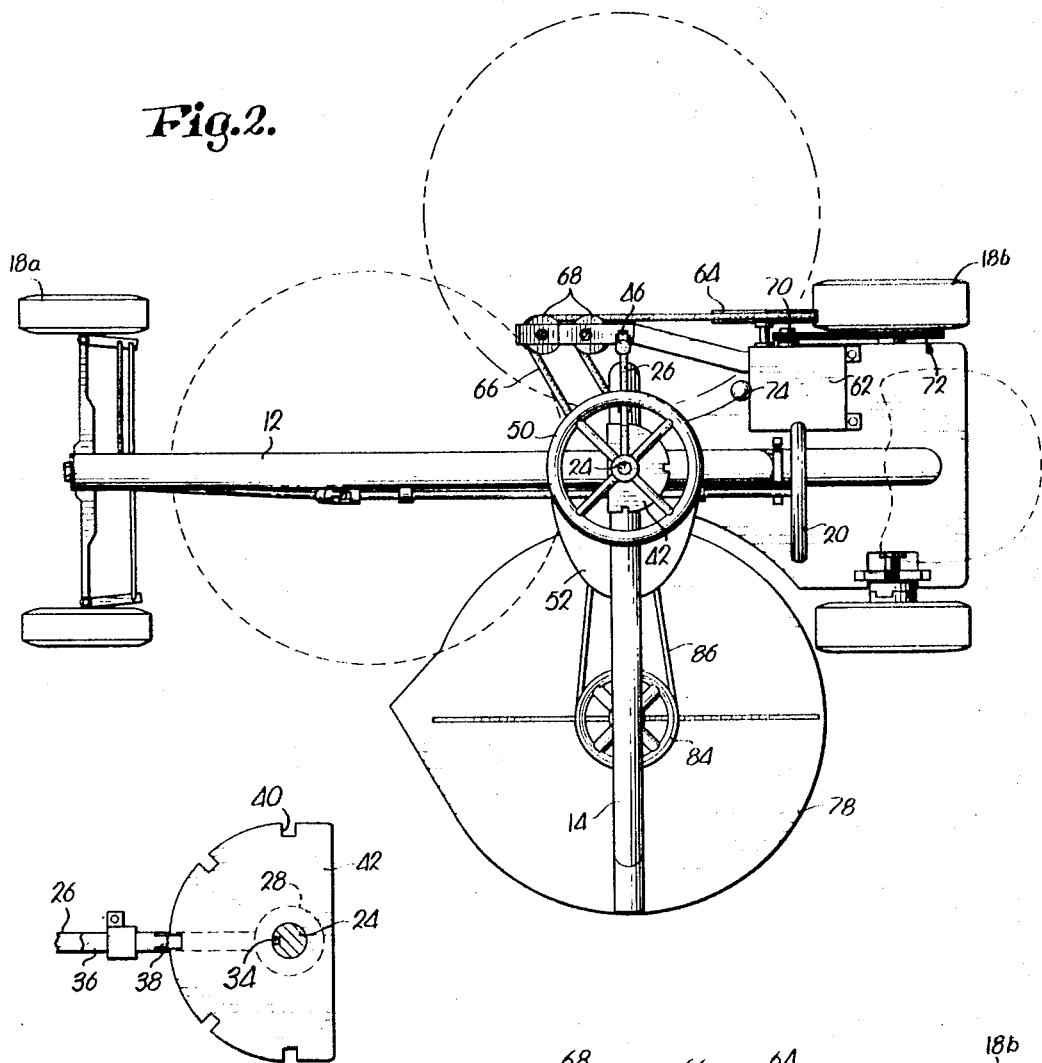
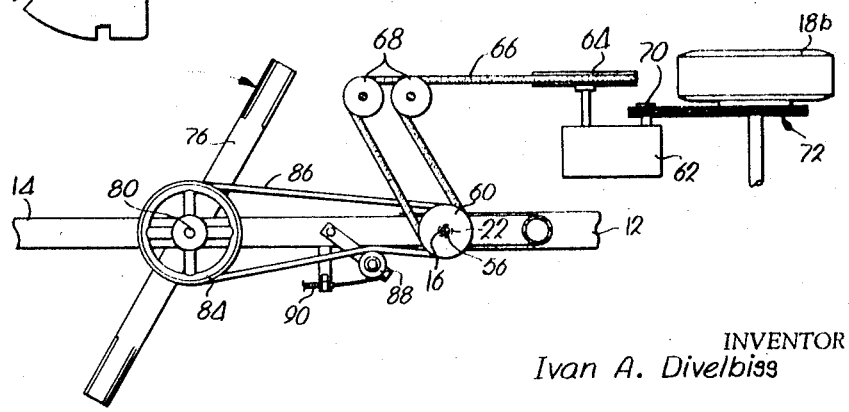
INVENTOR
Ivan A. Divelbiss
BY
*Hovey, Schmidt, Johnson & Hovey*
ATTORNEYS.

United States Patent Office 3,457,710
Patented July 29, 1969

3,457,710
LAWNMOWER
Ivan A. Divelbiss, 101 E. 82nd St.,
Kansas City, Mo. 64118
Filed Aug. 19, 1966, Ser. No. 573,633
Int. Cl. A01d *55/32*
U.S. Cl. 56—25.4                                    5 Claims

ABSTRACT OF THE DISCLOSURE

A riding lawnmower having a swingable subframe mounted on the main frame of the mower for rotation about an upright axis relative to the main frame. The output shaft of the prime mover is coaxial with such axis, and the prime mover is mounted on the subframe for movement therewith from side to side as the subframe is swung to position a rotary blade laterally of the path of travel of the main frame. The prime mover also supplies motive power to the wheels of the mower upon which the main frame is mounted for movement over the ground.

---

This invention relates to lawnmowers and, particularly to self-propelled riding mowers having a rotary cutter blade.

Self-propelled lawnmowers preferably have a single motor for driving the cutter blade, as well as providing power for moving the mower. By providing power trains to accomplish these two purposes, the overall expense of the completed unit is substantially reduced. In the past it has been thought necessary to maintain the cutter blade and the wheels of the mower in fixed relative positions so that a motor having a single rotatable shaft could be utilized for driving both the wheels and the blade. As a result, the structure of previously used lawnmowers has prevented the cutter blade from being moved into a position adjacent obstacles such as fences and trees and thus, it has been necessary to trim around such obstacles by hand when a closely manicured appearance was desired. Manifestly, with previous mowers, it has been impossible to mow obstructed, sloping or other areas which were not traversable by the wheels of the mower.

Therefore, it is the primary object of the instant invention to provide mower apparatus having a single motor for powering both the cutting means and the drive mechanism wherein the cutter blade is swingable to a position at the side of the mower so that the cutter may be maneuvered into a position adjacent obstacles or for cutting a swath along a sloping or other area which is not traversed by the wheels of the mower during the cutting of the same.

As a corollary to the foregoing object, it is a very important aim of the invention to provide such a lawnmower wherein is included a common drive shaft and structure permitting lateral movement of the cutter blade without changing the operating relationship between the blade and the shaft or between the propelling mechanism and the shaft so that the blade may be moved relative to the propelling mechanism.

A very important object of the present invention is to provide a lawnmower of the type described wherein is included swingable structure mounted on the main frame of the mower for rotation about an upright axis relative to the main frame and rotatable drive means mounted for rotation about the upright axis so that the cutter blade may be mounted on the swingable structure and swung therewith without changing its position relative to the drive means. Furthermore, it is inherent in this construction that the drive means may be carried by the swingable structure, and yet its position relative to the propelling mechanism will remain constant during swinging of the structure because the drive means is mounted for rotation about the axis upon which the structure is swung.

Another important object of the instant invention is the provision of mower apparatus such as has been described above including a gasoline powered reciprocating engine or the like mounted on the swingable structure and having a rotatable shaft aligned with the axis about which the structure is swung, to the end that rotatable drive means for driving both the cutter blade and the propelling mechanism may be mounted directly on the engine shaft.

It is a further important object of the invention to provide adjustable raising and lowering means for a mower of the type described whereby the cutter blade may be selectively moved toward or away from the ground being mowed.

Yet a further object of the invention is to provide screw means carried by the structure coaxial with the axis of swinging of the latter to the end that the structure may be shifted vertically along said axis for raising and lowering the cutter blade mounted thereon.

In the drawings:

FIGURE 1 is a side elevational view of a mower apparatus embodying the principles and concepts of the instant invention;

FIG. 2 is a top plan view of the apparatus with the cutter blade positioned to one side of the path of travel of the mower and with alternate cutter blade positions being shown by dashed lines;

FIG. 3 is a top plan view partially in cross section having certain parts thereof being broken away to reveal operational and constructional details;

FIG. 4 is a partial side elevational view of the opposite side of the mower shown in FIG. 1;

FIG. 5 is an enlarged view, partly in cross section, of the control mechanism for swinging and for raising and lowering the cutter blade; and FIG. 6 is a view taken along line 6—6 of FIG. 5.

A mower apparatus embodying the principles of the instant invention is shown in FIG. 1 and broadly designated by the numeral 10. Apparatus 10 includes a main frame 12 and swingable structure in the nature of a subframe 14 carried by main frame 12 for swinging thereon about an upright axis 16. Wheel means in the nature of a plurality of wheels 18a and 18b are provided for adapting apparatus 10 for movement along a path of travel. Steering mechanism 20 is carried by main frame 12 for manipulating the forwardmost wheels 19a in a manner well known to those skilled in the art.

Subframe 14 has a lower pin 22 and an upper pin 24 aligned with axis 16 and journalled through appropriate bearing structures 25 on main frame 12 to permit swinging of subframe 14 about axis 16. An operating lever 26 has a sleeve 28 circumscribing pin 24 as can be seen in FIG. 5. A key 30 is received in corresponding keyways 32 and 34 of sleeve 28 and pin 24 respectively, so that pin 24 and thereby subframe 14 may be rotated about axis 16 by swinging lever 26. Viewing FIG. 6, it may be seen that lever 26 is provided with a shiftable element 36 having an ear 38 selectively engageable with a plurality of slots 40 in the periphery of a semicircular plate 42. Normally, a spring 44 yieldably biases ear 38 into a selected slot 40 to prevent swinging of lever 26 and thereby subframe 14 about axis 16. A lever number 46 is carried by lever 26 for shifting element 36 against the bias of spring 44 to withdraw ear 38 from slots 40, whereupon lever 26 is free to swing subframe 14.

Pins 22 and 24 are vertically shiftable in structures 25 longitudinally of axis 16. Screw means 48 on the upper end of pin 24 is threadably received in the central bore of a jack 50. Jack 50 rides on sleeve 28 as can be seen in FIG. 5, and key 30 is shorter in length than keyway 34 in pin 24. Hence, as jack 50 is selectively rotated in opposite directions, pin 24, and thus subframe 14, will be alternately raised and lowered. It is to be noted that the length of keyway 34 in relationship to the length of key 30 permits longitudinal shifting of pin 24 relative to lever 26 without disrupting the operative interengagement therebetween.

Prime mover means in the nature of a gasoline powered reciprocating engine 52 is mounted on subframe 14 by mounting means 54. Engine 52 has an output shaft 56 rotatable when engine 52 is actuated. Shaft 56 is mounted for rotation about axis 16 as can be seen in FIG. 1. Rotatable drive means in the nature of a pair of side-by-side pulleys 58 and 60 are coaxially mounted on shaft 56 for rotation therewith about axis 16.

Means for operably connecting pulley 60 and rear wheels 18b include a transmission 62 having a sheave 64 thereon. A belt 66 is trained around sheave 64, a pair of idlers 68 and pulley 60 as can be seen viewing FIG. 3. Transmission 62 has a pinion gear 70 operably coupled with rear wheels 18b through the medium of chain and sprocket means 72. A lever 74 and clutch means (not shown) are provided for shifting the internal mechanism of transmission 62 in a manner well known to those skilled in the art for placing gear 70 and thereby mower 10 in forward motion, reverse motion or neutral.

Cutter means in the nature of a rotary blade 76 is housed within a cowling 78 and mounted on subframe 14 for rotation about a substantially vertical axis. It can be seen viewing FIGS. 1 and 4 that the axis of rotation of blade 76 is substantially parallel to axis 16 and is spaced forwardly of the mower 10 therefrom. A shaft 80 is mounted on blade 76 for rotation therewith. Shaft 80 is journalled through bearing structure 82 carried by subframe 14, and driven means in the nature of a sheave 84 is mounted on shaft 80 for rotation therewith and with blade 76.

It is to be noted that sheave 84 and pulley 58 each comprise a pair of side-by-side elements having belt means in the nature of a pair of side-by-side belts 86 trained therearound. Although, as shown in the drawings, the drive means for blade 76 is preferably a dual belt arrangement, it is to be appreciated that a single belt, or for that matter, a gear train, could be used with substantially identical results. An idler 88 is swingably mounted on subframe 14 as can be seen viewing FIG. 3, for tightening or loosening belt 86 on sheave 84 and pulley 58. It is to be understood that upon swinging idler 88 in a direction to loosen belt 86, pulley 58 is permitted to slip relative to belt 86 and thus, blade 76 will cease to rotate in response to the rotation of pulley 58. Conversely, when idler 88 is swung in a direction to tighten belt 86, the latter will be placed in tight frictional engagement with pulley 58 and sheave 84 to cause blade 76 to rotate with pulley 58. Flexiable cable and push wire means 90 (shown only partially) are carried by apparatus 10 for selectively causing blade 76 to rotate when engine 52 is actuated by swinging idler 88 to tighten or loosen belt 86. This action can best be seen by viewing FIG. 3.

Apparatus 10 has a single engine 52 for driving blade 76 and simultaneously propelling apparatus 10. However, blade 76 is swingable laterally of the path of travel of apparatus 10 to a position for mowing areas which would otherwise be unaccessible to mower 10 because of the disposition of the wheels thereon. Manifestly, apparatus 10 may be used for mowing areas which will not permit passage of wheels 18a and 18b thereacross. The strategic placement of shaft 56 and pulleys 58 and 60 permit subframe 14, and thereby blade 76, to be swung as indicated in FIG. 2. Hence, all of the aims, objects and purposes of the present invention have been fulfilled in a substantial sense.

Having thus described the invention, what is claimed as new and desired to be secured by Letters Patent is:

1. Mower apparatus comprising:
  a main frame having ground-engaging wheel means thereon adapting the frame for movement along a path of travel;
  a subframe swingable on said main frame about an upright axis and normally positioned above said path as the main frame moves therealong;
  cutter blade means on said subframe, said blade means being rotatable relative to said subframe about a substantially vertical axis spaced from said upright axis and swingable with said subframe laterally of said path;
  a prime mover carried by said subframe and swingable therewith, and having rotatable output drive means disposed for rotation about said upright axis relative to said subframe;
  driven means coaxially rotatable with said blade means;
  a driven device carried by said main frame and operably coupled with said wheel means;
  first power transmission means coupling said output drive means with said driven means for rotating the latter to, in turn, rotate said blade means;
  second power transmission means coupling said output drive means with said driven device for rotating the latter to drive the wheel means, whereby the latter and the blade means are simultaneously driven without interruption regardless of the lateral position of said subframe,
  said main frame including a pair of vertically spaced frame members between which said subframe is disposed; and
  a pair of vertically spaced, pivotal mounts defining said upright axis and securing said subframe to corresponding main frame members to support the subframe for said swinging thereof,
  said prime mover being disposed on said subframe between said mounts to preclude interference of the prime mover with the main frame during swinging of the subframe.

2. Mower apparatus as set forth in claim 1, wherein said mounts support said subframe for swinging movement about said upright axis at least 90° in each direction from said normal position thereof.

3. Mower apparatus as set forth in claim 1, wherein said output drive means includes a pair of side-by-side pulleys operably connected for simultaneous rotation, said driven means including a first sheave, said first transmission means including first belt means trained around one of said pulleys and said first sheave, said driven device including a second sheave, said second transmission means including second belt means trained around the other pulley and said second sheave whereby said sheaves rotate simultaneously in response to rotation of said output drive means.

4. Mower apparatus as set forth in claim 1, wherein is provided adjustable means mounting said subframe on said main frame for selectively raising and lowering the subframe and thereby the blade means relative to the main frame.

5. Mower apparatus as set forth in claim 4, wherein said adjustable means includes a screw means disposed coaxially with said upright axis.

References Cited

UNITED STATES PATENTS

| | | | |
|---|---|---|---|
| 2,496,982 | 2/1950 | Brukholder | 56—25.4 |
| 2,838,901 | 6/1958 | Davis | 56—25.4 |
| 2,851,842 | 9/1958 | Harp | 56—25.4 |
| 3,063,226 | 11/1962 | Pfauser | 56—25.4 |
| 3,115,739 | 12/1963 | Thoen et al. | 56—25.4 X |
| 3,183,651 | 5/1965 | Hoefler | 56—25.4 |
| 3,261,150 | 7/1966 | Fitzgerald | 56—25.4 |

ANTONIO F. GUIDA, Primary Examiner

P. A. RAZZANO, Assistant Examiner